United States Patent
Maeng et al.

(10) Patent No.: US 11,029,824 B2
(45) Date of Patent: Jun. 8, 2021

(54) METHOD AND APPARATUS FOR MOVING INPUT FIELD

(71) Applicant: SAMSUNG SDS CO., LTD., Seoul (KR)

(72) Inventors: Deok Young Maeng, Seoul (KR); You Jin Jang, Seoul (KR); Hyeun Im Cho, Seoul (KR); Bo Young Choi, Seoul (KR); Jae Won Seo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/763,673

(22) PCT Filed: Nov. 20, 2018

(86) PCT No.: PCT/KR2018/013883
§ 371 (c)(1),
(2) Date: May 13, 2020

(87) PCT Pub. No.: WO2019/107799
PCT Pub. Date: Jun. 6, 2019

(65) Prior Publication Data
US 2020/0301552 A1    Sep. 24, 2020

(30) Foreign Application Priority Data
Nov. 30, 2017    (KR) .......................... 10-2017-0162940

(51) Int. Cl.
*G06F 3/0488*    (2013.01)
*G06F 3/0484*    (2013.01)
*G06F 3/0482*    (2013.01)

(52) U.S. Cl.
CPC .......... *G06F 3/0484* (2013.01); *G06F 3/0482* (2013.01); *G06F 3/04883* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,563,610 B2* | 2/2017 | Tidhar | .................... | G06F 40/14 |
| 9,639,508 B2* | 5/2017 | Tidhar | .................... | G06F 40/14 |
| 2007/0280179 A1* | 12/2007 | Van Belle | .......... | G06F 3/04842 370/338 |

(Continued)

FOREIGN PATENT DOCUMENTS

| KR | 10-2012-0035293 A | 4/2012 |
|---|---|---|
| KR | 10-1328202 B1 | 11/2013 |

(Continued)

OTHER PUBLICATIONS

International Search Report for PCT/KR2018/013883 dated Feb. 26, 2019.

*Primary Examiner* — Hien L Duong
(74) *Attorney, Agent, or Firm* — The PL Law Group, PLLC

(57) ABSTRACT

A method of moving an input focus in a plurality of input fields according to an embodiment of the present invention includes. displaying an input focus positioned in a first input field included in the plurality of input fields on a screen, receiving an input of a first touch gesture in a touch gesture input area on the screen, and moving the input focus to a second input field in response to the input of the first touch gesture.

17 Claims, 24 Drawing Sheets

(56) References Cited

U.S. PATENT DOCUMENTS

| | | | | |
|---|---|---|---|---|
| 2008/0178098 A1* | 7/2008 | Yoon | ............... | G06F 3/0481 |
| | | | | 715/762 |
| 2008/0215976 A1* | 9/2008 | Bierner | ............ | G06F 40/174 |
| | | | | 715/708 |
| 2009/0171669 A1 | 7/2009 | Engelsma et al. | | |
| 2014/0306897 A1* | 10/2014 | Cueto | ............ | G06F 3/04883 |
| | | | | 345/173 |
| 2016/0170636 A1* | 6/2016 | Lee | ............... | G06F 3/04886 |
| | | | | 715/773 |
| 2020/0241715 A1* | 7/2020 | Cueto | ............ | G06F 3/0488 |

FOREIGN PATENT DOCUMENTS

| | | |
|---|---|---|
| KR | 10-1433969 B1 | 8/2014 |
| KR | 10-2016-0071228 A | 6/2016 |

\* cited by examiner

FIG. 2

METHOD AND APPARATUS FOR MOVING INPUT FIELD

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/013883, filed on Nov. 20, 2018, which claims priority to the benefit of Korean Patent Application No. 10-2017-0162940 filed in the Korean Intellectual Property Office on Nov. 30, 2017, the entire contents of which are incorporated herein by reference.

BACKGROUND

1. Field

The present invention relates to a method and an apparatus for moving an input field. More particularly, the present invention relates to a method and an apparatus that can conveniently manipulate input and correction in a plurality of input fields present in membership, payment information, and the like.

2. Description of the Related Art

In existing input fields, when writing text and moving to the next input field, a next button on a soft keyboard is touched or the corresponding input field is touched to move the input focus.

Further, in order to modify previously written text of the input field, operations, such as scroll, moving of the input focus and touching of the input field, are required.

Such means may require a large number of manipulation actions by a user who inputs text into an input field, and may cause a touch miss according to the manipulation.

As a result, a lot of time is spent on the user inputting information in the input field and there are several inconveniences.

Therefore, there is a need for a means of simplifying movement of the input field and allowing a user to easily write text in the input field.

SUMMARY

An embodiment of the present invention is to provide a method and apparatus for moving an input focus of an input field in response to a touch gesture for a keypad adjacent area.

Another embodiment is to provide a method and apparatus for expanding an input focus and an input field in response to a touch gesture for a keypad adjacent area.

Embodiments of the present invention are not limited to the above-mentioned embodiments, and other embodiments not mentioned will be clearly understood by those skilled in the art from the following description.

A method of moving an input field according to an embodiment of the present invention comprises displaying a first input field having an input focus on a screen, receiving an input of touch gesture for an adjacent area of a keypad and moving the input focus to a second input field in response to the input of touch gesture.

A method of moving an input field according to an embodiment may further comprise displaying a second input field having an input focus on a screen, wherein the second input field is a last input field among a plurality of input fields. And, the method may further comprises receiving an input of last touch gesture for a keypad adjacent area and displaying the plurality of input fields and a complete button in response to the last touch gesture.

In an embodiment, displaying a first input field having an input focus on a screen may comprise providing a user input field in the keypad adjacent area.

In an embodiment, the method may further comprise displaying, upon detecting a text in the user input field, the text in the input field having the input focus in real time.

In an embodiment, displaying a first input field having an input focus on a screen may comprise displaying a progress bar indicating a position of the input focus in the keypad adjacent area.

In an embodiment, displaying a first input field having an input focus on a screen comprises providing a drag button for moving the input focus at top of the keypad adjacent area, receiving an input of touch gesture for the drag button and moving the input focus by reflecting speed of the touch gesture for the drag button.

In an embodiment, providing a drag button for moving the input focus at top of the keypad adjacent area may comprise displaying a label box corresponding to the input focus in an area adjacent to the drag button.

A method of moving an input field according to an embodiment further comprises moving the input focus to a third input field in response to the input of touch gesture, wherein the third input field is perpendicular to the second input field and the direction of movement of the input focus coincides with the direction of the touch gesture.

In an embodiment, moving the input focus to a second input field in response to the input of touch gesture comprises enlarging the input focus and the second input field.

In an embodiment, receiving an input of touch gesture for an adjacent area of a keypad comprises receiving an input of long touch gesture on the keypad and changing the keypad to an area for receiving an input of the touch gesture in response to the long touch gesture.

In an embodiment, changing the keypad to an area for receiving an input of the touch gesture in response to the long touch gesture may comprise providing a label in the changed area.

A method of moving an input field according to an embodiment further comprises receiving an input of touch gesture perpendicular to the touch gesture and displaying a list including the first input field and the second input field on a screen in response to the perpendicular touch gesture.

A computing apparatus for moving an input field according to another embodiment of the present invention may comprise a display for displaying a plurality of input fields, a processor and a memory for storing one or more instructions executed by the processor, wherein the one or more instructions comprises an instruction for displaying a first input field included in the plurality of input fields on a screen, and an instruction for receiving an input of drag gesture for an adjacent area of a keypad displayed on the display and changing the input focus from the first input field to a second input filed included in the plurality of input fields in response to the input of drag gesture.

BRIEF DESCRIPTION OF THE DRAWINGS

These and/or other aspects will become apparent and more readily appreciated from the following description of the embodiments, taken in conjunction with the accompanying drawings in which:

FIG. 2 is a diagram for describing an existing method of moving an input field.

DETAILED DESCRIPTION

Figure 1:
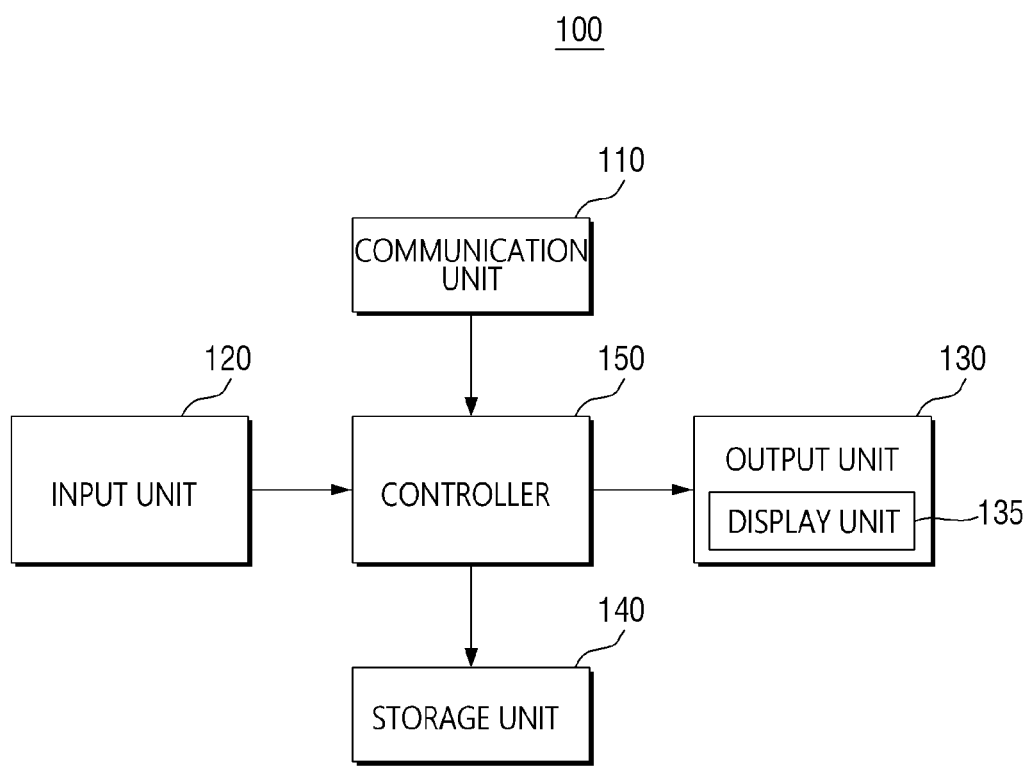
FIG. 1 is a block diagram of a device, in which a method of moving an input field is performed according to an embodiment of the present invention.

Hereinafter, exemplary embodiments of the present invention will be described in detail reference to the accompanying drawings. Advantages and features of the present invention, and methods for achieving them will become apparent with reference to the embodiments described below in detail in conjunction with the accompanying drawings. However, the present invention is not limited to the embodiments disclosed below, but can be implemented in various different forms, and the embodiments are for merely making the disclosure of the present invention complete, and informing those skilled in the art on the full scope of the invention. The present invention is defined only by the scope of the claims. Like reference numerals refer to like elements throughout the specification.

Unless otherwise defined, all terms used in the present specification (including technical and scientific terms may be used in a sense that can be commonly understood by those skilled in the art. Further, commonly used terms defined in the dictionary are not to be interpreted ideally or excessively unless they are clearly specifically defined. The terms used herein is for the purpose of describing particular embodiments only and is not intended to be limiting of the present invention. In this specification, the singular forms also include the plural unless specifically stated otherwise in the description.

As used herein, the term "comprises" and/or "comprising" refers to that a mentioned component, step, operation and/or element does not exclude the presence or addition of one or more other components, steps, operations and/or elements.

Prior to the description of the specification, some terms used herein will be clarified.

In this specification, the input field refers to an area where a text input of a user is displayed on a screen of a function execution device. The input field may be displayed as a plurality of input fields on the screen. The input field may be divided into a first input field, a second input field and a third input field, wherein the first input field may indicate a current input field and the second input field may indicate an input field displayed above or below the first input field. Further, the third input field may indicate an input field displayed on the left side or the right side of the first input field.

Hereinafter, some embodiments of the present invention will be described in detail with reference to the accompanying drawings.

FIG. 1 is a block diagram of a device, in which a method of moving an input field is performed according to an embodiment of the present invention. Hereinafter, for the convenience of description, a device, in which a method of moving an input field is performed, is referred to as a function execution device.

The function execution device 100 illustrated in FIG. 1 may be a touch-based mobile computing device. For example, the function execution device 100 according to some embodiments may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device, e.g., smartwatch, smart glass, head mounted display (HMD).

However, it will be apparent to those skilled in the art that the configuration according to some embodiments may be applied to a fixed terminal such as a digital TV, a desktop computer, a digital signage, and the like.

Referring to FIG. 1, the function execution device 100 may include a communication unit 110, an input unit 120, an output unit 130, a storage unit 140, and a controller 150. The components shown in FIG. 1 are not essential to implementing the function execution device 100, so that the function execution device 100 described in some embodiments may have more or fewer components than those listed above.

The communication unit 110 may include a mobile communication module and a wireless communication module for communicating with an external device. The communication unit 110 may receive data such as a voice call signal, a video call signal, a text/multimedia message, an E-mail and multimedia content.

When the function execution device 100 is a fixed computing device, the communication unit 110 may include a wired internet module.

The mobile communication module provided in the communication unit 110 transmits and receives an wireless signal with at least one of a base station, an external terminal and a server on a mobile communication network constructed according to technical standards for mobile communication, technical standards for communication methods or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE) and Long Term Evolution-Advanced (LTE-A)).

The wireless internet module provided in the communication unit 110 refers to a module for wireless interact access. The wireless internet technologies used in the wireless internet module include WAN (Wireless LAN), Wi-Fi (Wireless-Fidelity), Wi-Fi (Wireless Fidelity) Direct, Digital Living Network Alliance (DLA), Wireless Broadband (Wi- Bro), World Interoperability for Microwave Access (WiMAX), High Speed Downlink Packet Access (HSDPA), High Speed Uplink Packet Access (HSUPA), Long Term Evolution (LTE) and Long Term Evolution-Advanced (LTE-A).

According to some embodiments, the communication unit 110 may transmit card information (e.g., a card number, a card holder name, a card expiration date, etc.) stored in the storage unit 140 to an external terminal in response to a preset input. Here, the preset input may be an input for selecting any card object among the card objects displayed on the display unit 135.

The input unit 120 may include a camera or an image input unit for inputting an image signal, a microphone or an audio input unit for inputting an audio signal, and a user input unit for receiving information from a user (for example, a touch key, a mechanical key, etc.). The voice data or the image data collected by the input unit 120 may be analyzed and processed as a control command of the user.

The output unit 130 is to generate an output related to visual, auditory or tactile, and may include a display unit 135. However, it is not limited thereto and may include at least one of a sound output unit, a hap tip module and a light output unit.

The display unit 135 forms a layer structure with or is integrally formed with the touch sensor, thereby implementing a touch screen. The touch screen may function as an input unit 120 providing an input interface between the function execution device 100 and the user, and at the same time, may provide an output interface between the function execution device 100 and the user.

The display unit 135 may include a touch sensor. The touch sensor detects a touch (or touch input) applied to the touch screen (or the display unit 135) using at least one of various touch methods, such as resistive, capacitive, infrared, ultrasonic and magnetic fields method.

As an embodiment, the touch sensor may be configured to convert a change in pressure applied to a specific portion of the touch screen or capacitance generated at a specific portion into an electrical input signal. The touch sensor may be configured to detect a location, area, pressure at the touch, capacitance at the touch, and the like, where the touch object applying touch to the touch screen is touched on the touch sensor. Here, the touch object is an object applying touch to the touch sensor and may be, for example, a finger, a touch pen, a stylus pen or a pointer.

As such, when there is a touch input to the touch sensor, the corresponding signal(s) is sent to the touch controller. The touch controller processes the signal(s) and then transmits the corresponding data to the controller 150. As a result, the controller 150 may determine which area of the display unit 135 is touched. Here, the touch controller may be a separate component from the controller 150 or may be the controller 150 itself.

Meanwhile, the controller 150 may perform different control or perform the same control according to the type of the touch object that touches the display 135. Whether to perform different control or the same control according to the type of touch object may be determined according to the current operation state of the function execution device 100 or the application program being executed.

When the display unit 135 is implemented as the touch screen, the touch screen may sense a touch input using a touch pen, a stylus pen or a pointer, in addition to a touch input inputted through a user's finger. Further, in addition to the touch input inputted while being in contact with the surface of the touch screen, the touch screen may also sense proximity touch gestures of a predetermined distance from the touch screen. To this end, the touch screen may further include a proximity sensor.

Touch input to the touchscreen may be various types of touch, such as short (or tap) touch, long touch, multi touch, drag touch, flick touch, pinch-in touch, pinch-out touch, swiped touch, a hovering touch, and the like.

The storage unit 140 may store data supporting various functions of the function execution device 100. The storage unit 140 may store a plurality of application programs or applications that are driven by the function execution device 100, and data and instructions for the operation of the function execution device 100. At least some of these applications may be downloaded from an external server via wireless communication. Further, at least some of these applications may exist on the function execution device 100 from the time of shipment for the basic functions of the function execution device 100 (for example, an incoming call, an outgoing call, a message reception, etc.). Meanwhile, the application program may be stored its the storage unit 140 and installed on the function execution device 100, and may be driven by the controller 150 to perform an operation (or function) of the function execution device.

The storage unit 140 may temporarily or non-temporarily store data transmitted from an external device, input by a user or an operation result of the controller 150. The storage unit 140 may be configured to include a non-volatile memory, such as a read only memory (ROM), an erasable programmable ROM (EPROM), an electrically erasable programmable ROM (EEPROM), a flash memory, a hard disk, a removable disk or computer readable recording medium in any type well known in the technical field, to which the present invention belongs. Meanwhile, although the storage unit 140 is illustrated in a separate configuration in FIG. 1, the storage unit 140 may be integrated with the controller 150 to be described later and provided in the function execution device.

According to some embodiments, the storage unit 140 may store card information including a card number, a card holder name, a card expiration date, and the like. This may be information input by a user or information received from an external server.

The controller 150 may control the display 135 to display a card object corresponding to the card information stored in the storage unit 140 according to a specific command. In this case, the controller 150 may control the display unit 135 to display an area in a screen including a plurality of card objects.

The controller 150 controls the overall operation of each component. The controller 150 may be configured to include a central processing unit (CPU), a microprocessor unit (MPU), a micro controller unit (MCU) or any type of processor well known in the art. Further, the controller 150 may perform an operation on at least one application or program for executing a method according to some embodiments.

Meanwhile, although the communication unit 110, the input unit 120, the output unit 130, the storage unit 140 and the controller 5 150 have been described as the configuration of the function execution device 100 in the description of FIG. 1, according to an embodiment of the present invention, the function execution device 100 may include the display unit 135 and the controller 150 only.

Hereinafter, some embodiments will be described in detail with reference to FIG. 1.

Figure 2:
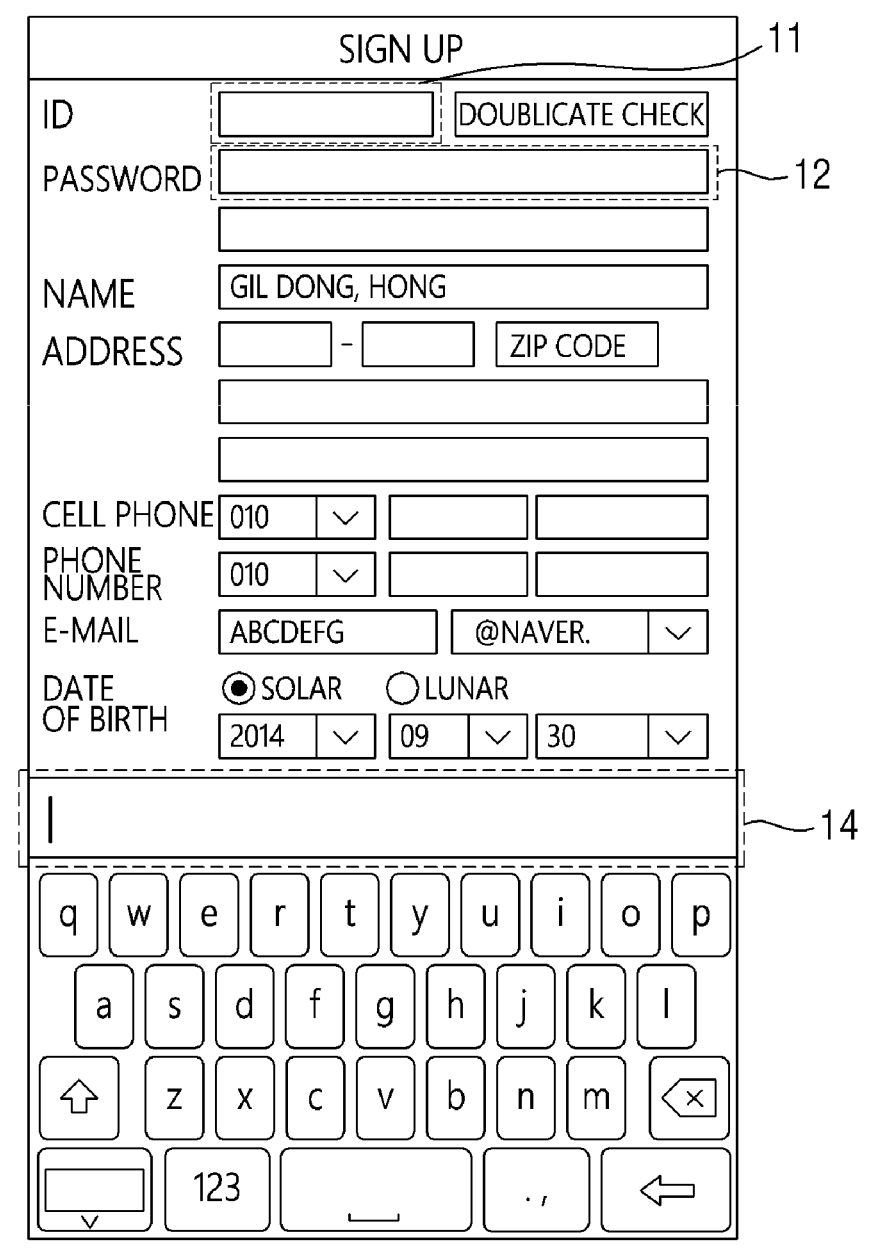

FIG. 2 is a diagram for describing an existing method of moving an input field.

Referring to FIG. 2, a screen, on which a plurality of input fields are displayed, can be seen in the screen, in which a user enters membership information in a specific service. The screen shows a first input field 11, in which the user's ID is displayed, a second input field 12, in which the user's password is displayed and a user input field 14, in which the user's text is input. Hereinafter, the inconvenience of the existing method of moving the input field will be described taking the first input field 11 and the second input field 12 as an example.

For example, while the user enters text for an ID in the first input field 11 and a password in the second input field 12, the user touches the area of the second input field 12 on the screen of the function execution device 100 to move to the second input field 12. However, if the user does not touch the area of the second input field 12 correctly, the user moves to another field differently from the user's intention.

Further, in the case of a small function execution device 100, in which one hand operation is mainly used, such as a smartphone, it is frequently required to use both hands to move an input field.

In order to overcome the problems above, various methods are proposed herein.

Figure 3:
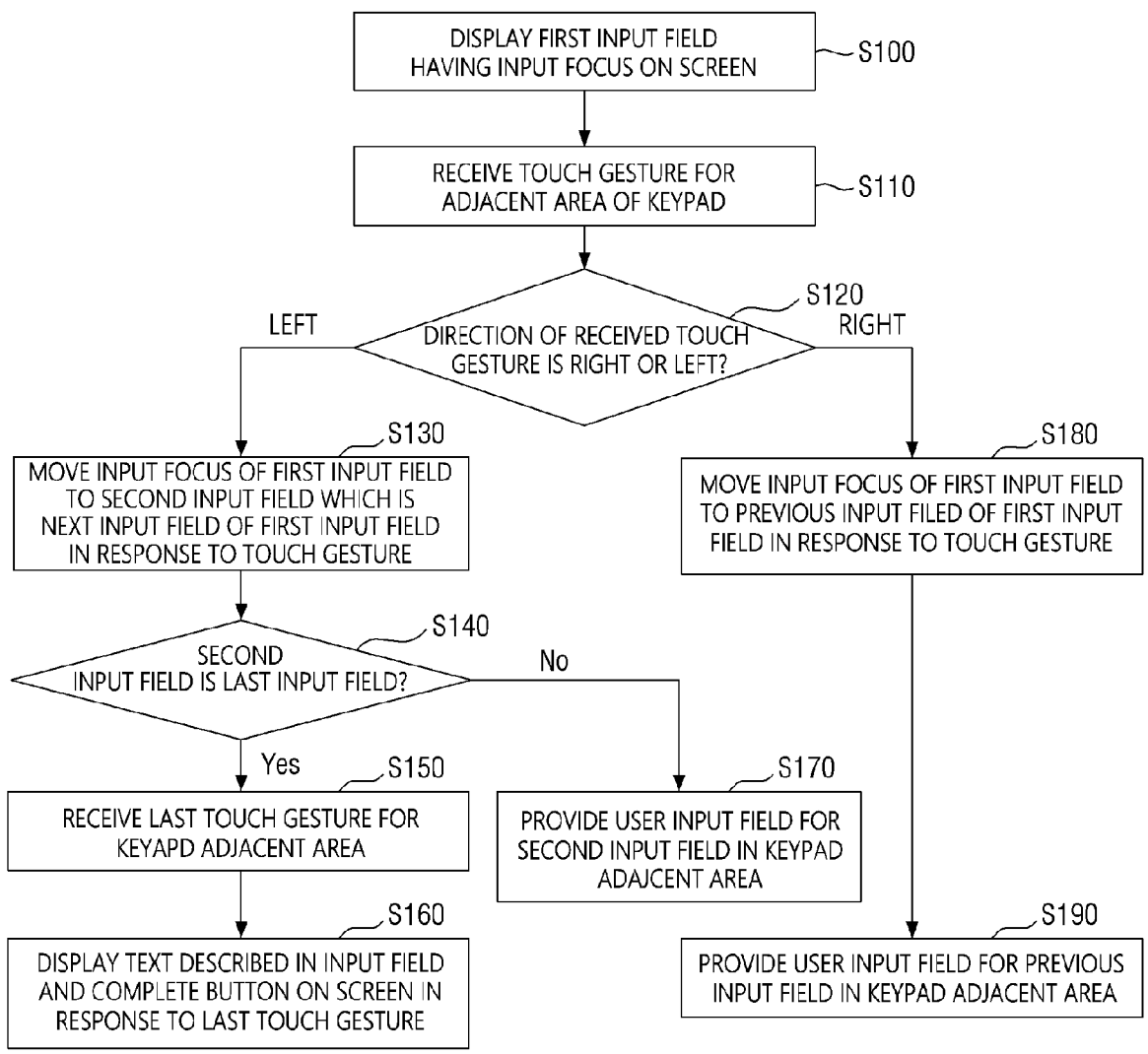
FIG. 3 is a flowchart of a method of moving an input field according to an embodiment of the present invention.

FIG. 3 is a flowchart of a method of moving an input field according to an embodiment of the present invention. However, this is only a preferred embodiment for achieving the object of the present invention, of course, some steps may be added or deleted as necessary, Hereinafter, a method of moving an input field according to the present embodiment will be described with reference to FIG. 3.

The function execution device displays the first input field having the input focus on the screen (S100). The user may visually check the current input field through the input focus.

The function execution device receives a touch gesture for an adjacent area of a keypad (S110). The touch gesture may include a drag touch and a swipe touch. The touch gesture is received in an adjacent area of the keypad, which has an advantage of allowing the user to easily make a touch input by holding the function execution device with one hand and using a thumb.

The function execution device determines whether the direction of the received touch gesture is right or left (S120). For example, it is assumed that labels (e.g., ID, password, etc.) for an input field are listed in order from left to right of the function execution device in the adjacent area of the keypad. When the user drags or swipes a finger's touch input from right to left, it will move from the current label to the next label. Conversely, if the user drags or swipes a finger's touch input from left to right, it will move back from the current label to the previous label.

If it is determined that the direction of the touch gesture is to left, the function execution device moves the input focus of the first input field to the second input field, which is the next input field, in response to the touch gesture (S130). Although not shown in the flowchart of FIG. 3, as the input focus is moved, the current label of the adjacent area of the keypad is changed to the next label.

The function execution device determines whether the second input field is the last input field (S140).

If it is determined that the second input field is not the last input field, a user input field for the second input field is provided in an adjacent area of the keypad (S170). Further, steps S100 to S140 and steps S100 to S190 may be performed again.

If it is determined that the second input field is the last input field, a last touch gesture for an adjacent area of the keypad is received (S150).

When the function execution device receives the last touch gesture, in response to the last touch gesture, the function execution device displays the text described in the input field and the complete button on the screen (S160). By step S160, there is an advantage that it is possible to naturally change the component to the complete button at the completion time, and give feedback on the completion to the user.

If it is determined that the direction of the touch gesture is to right, the function execution device moves the input focus of the first input field to the second input field, which is the previous input field, in response to the touch gesture (S180). Although not shown in the flowchart of FIG. 3, as the input focus is moved, the current label of the keypad adjacent area is changed to the previous label.

The function execution device, when the input focus is moved to the second input field, which is the previous input field, provides a user input field for the previous input field in the keypad adjacent area (S190).

FIGS. 4a to 4e are diagrams for describing a method of moving an input field according to an embodiment of the present invention. Hereinafter, a method of moving an input field according to the present embodiment will be described with reference to FIGS. 4a to 4e.

The adjacent area referred to in some embodiments of the present invention may be any area of the screen of the function execution device. The adjacent area may indicate an area, where the user is easy to make a touch gesture.

In an embodiment, the adjacent area may be arranged to the upper side of the keypad. If the adjacent area is arranged immediately adjacent to the upper side of the keypad, there is an advantage that the user can quickly make a touch gesture immediately after the text input is completed.

In another embodiment, the adjacent area may be arranged in the middle of the screen of the function execution device. This is to provide an optimal touch gesture area in consideration of the position of the user's thumb, the size of the screen of the function execution device and the like.

Figure 4A:
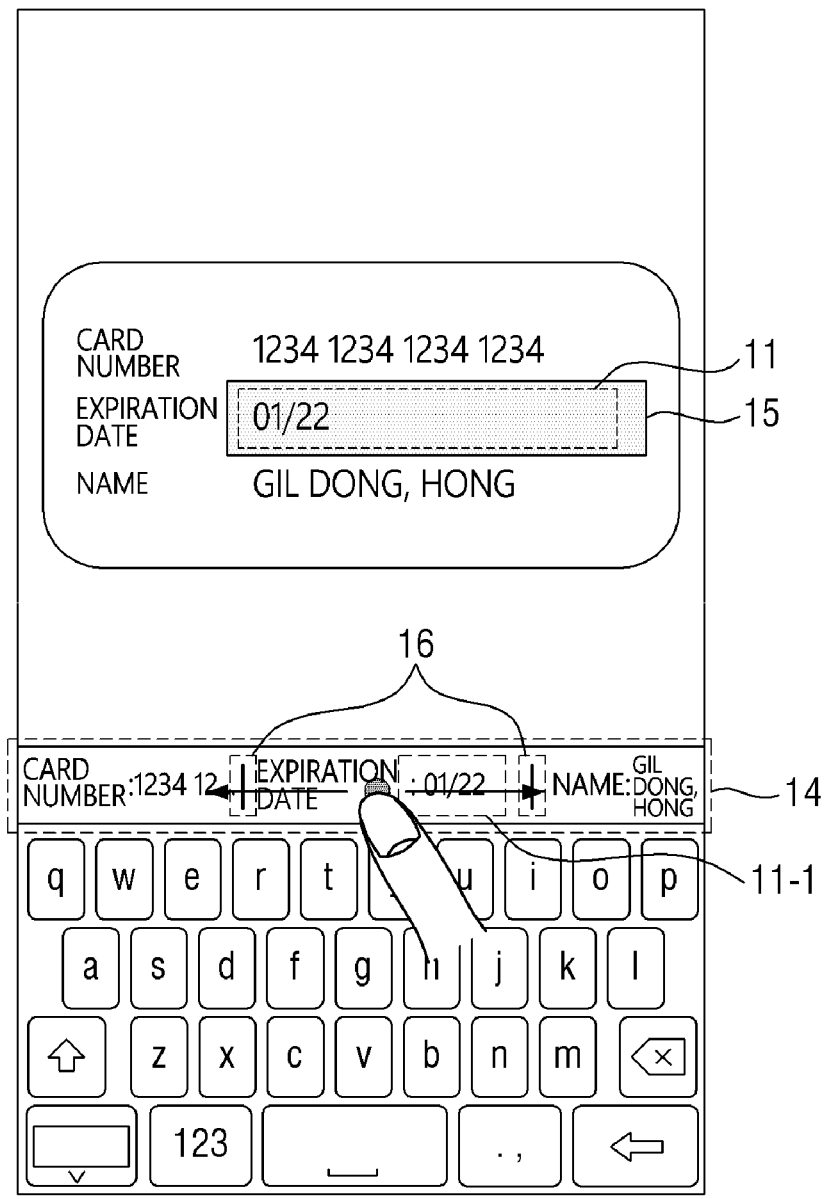
FIGS. 4a to 4e are diagrams for describing a method of moving an input field according to an embodiment of the present invention.

Referring to FIG. 4a, the first input field 11 and the input focus 15 are displayed at the top of the screen of the function execution device. Further, the user input field 14 is displayed in the adjacent area of the keypad. The user input field 14 displays a horizontal list view.

A plurality of labels and text corresponding to each label are displayed in the user input field 14, and a partition 16 may be displayed to distinguish the plurality of labels and the text corresponding to each label.

In an embodiment, the step of displaying the first input field having the input focus on the screen may include displaying two partitions 16 to provide the text input area 11-1 in the user input field 14. When the partition 16 is displayed and the text input area 11-1 is provided to the user, the user may input text in the text input area 11-1. Accordingly, the input text may be displayed in the first input field 11, which is the current input field.

Figure 4B:
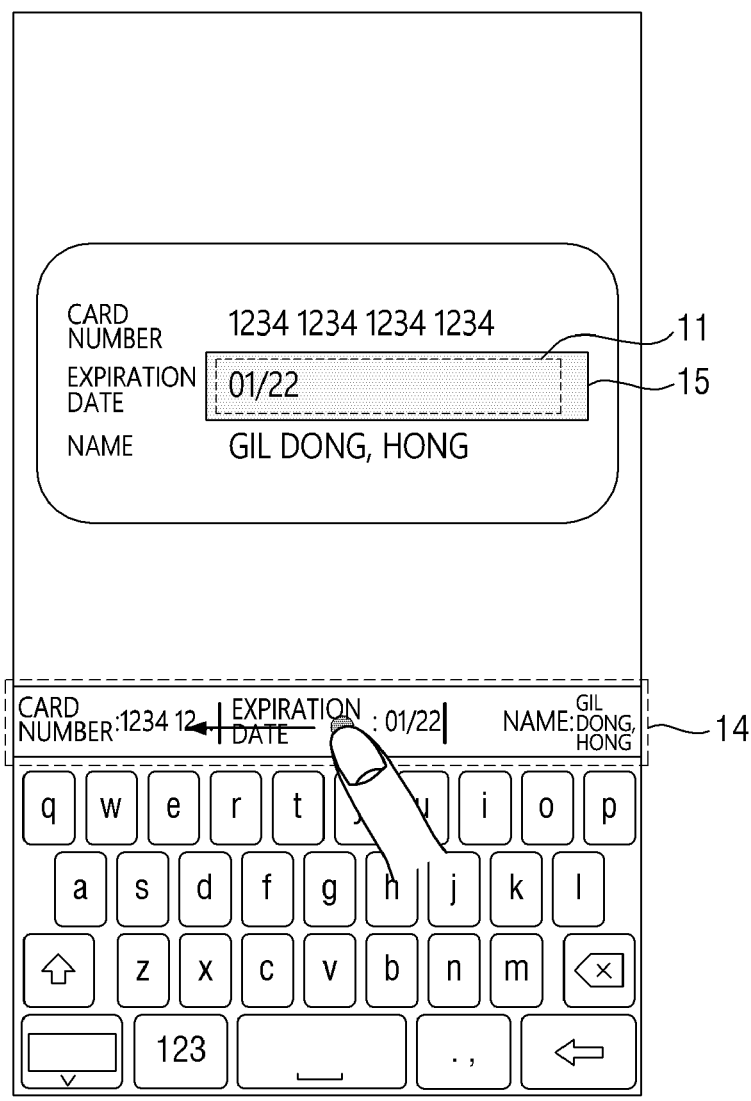

Referring to FIG. 4b, a first input field 11 having an input focus 15 is displayed on the screen of the function execution device, and the function execution device receives a user's touch gesture. When the user enters text in the first input field corresponding to the expiration date and moves to the next input field, the user will make a right to left touch gesture to the user input field 14 located in the adjacent area of the keypad.

Figure 4C:
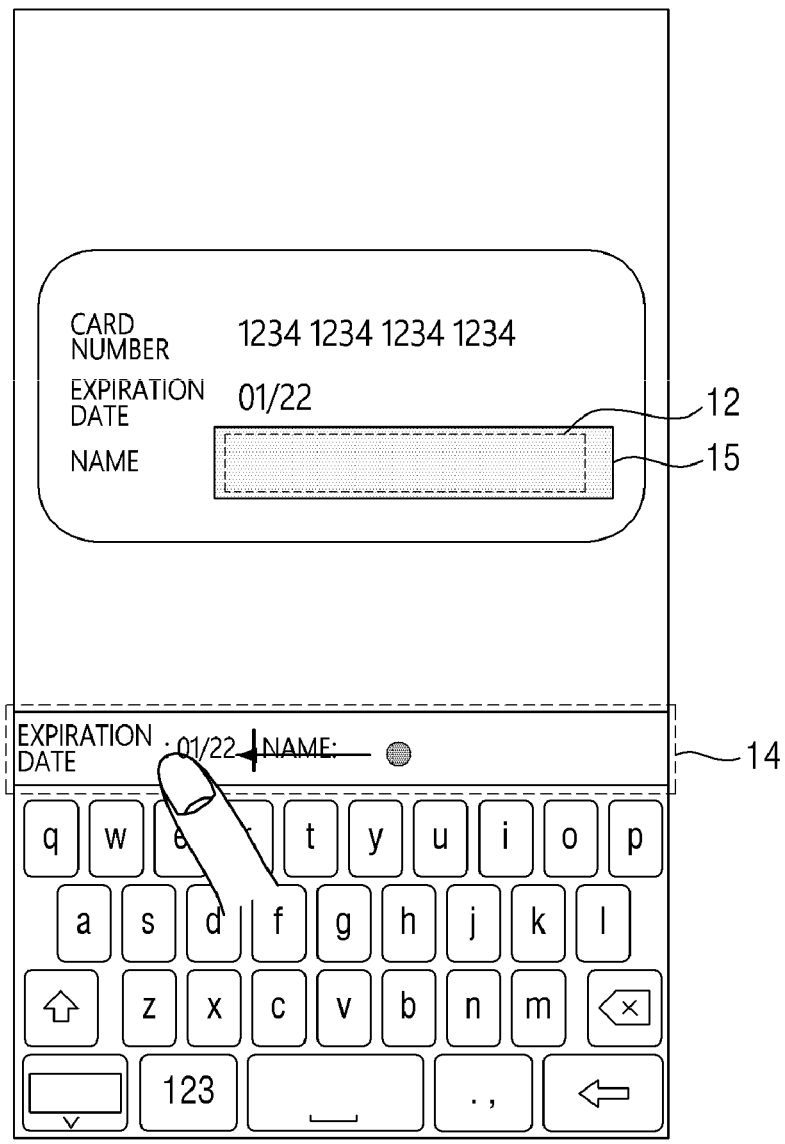

Referring to FIG. 4c, it can be seen that, in response to the input of the touch gesture, the function execution device moves the input focus to the second input field 12. Further, it can be seen that the horizontal list displayed in the user input field 14 is moved in the touch gesture direction.

Figure 4D:
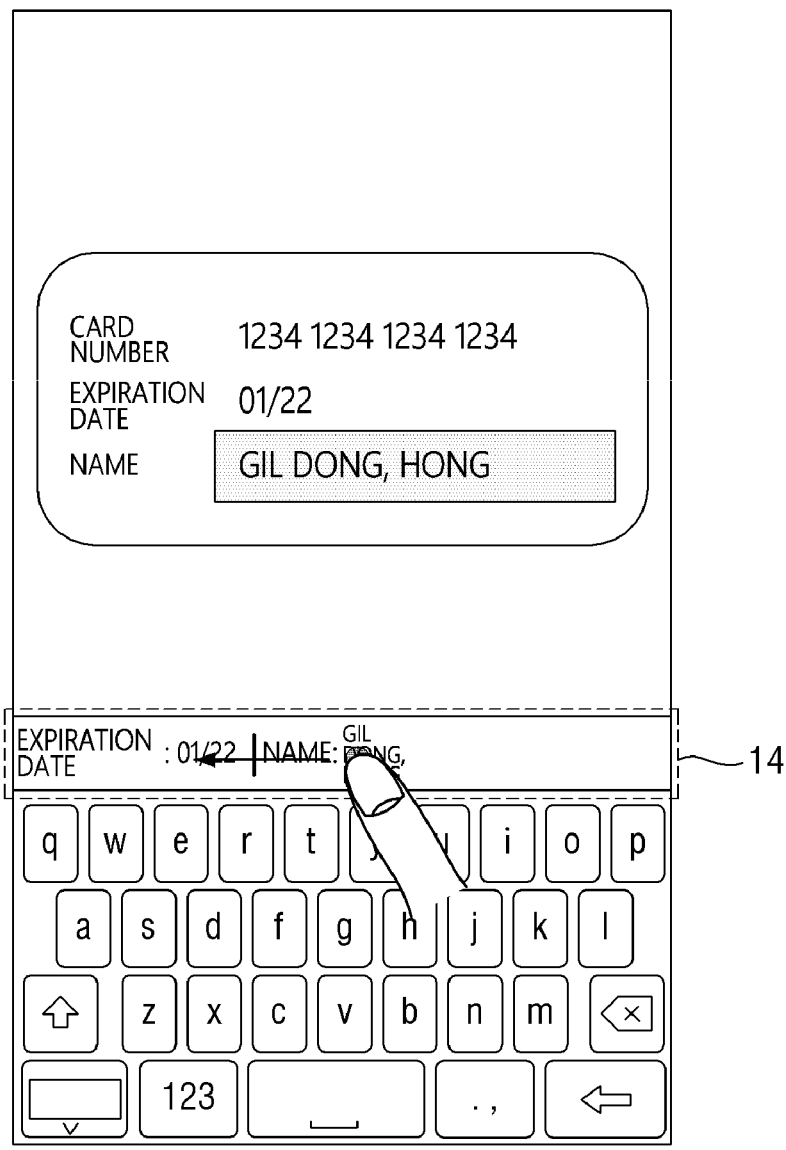
Figure 4E:

Referring to FIG. 4*d*, it can be seen that all descriptions of the input field are entered. At this time, the user intends the final completion action of the payment request or the like based on the text described in the input field. According to this intention, when the function execution device receives the user's last touch gesture in the area of the user input field 14, it will be changed to the last complete screen as shown in FIG. 4*e*. Accordingly, there is an advantage of facilitating access to the final step by using a touch gesture that has been previously performed without the need for the user to separately find out the complete button on the screen by scroll.

Figure 5A:
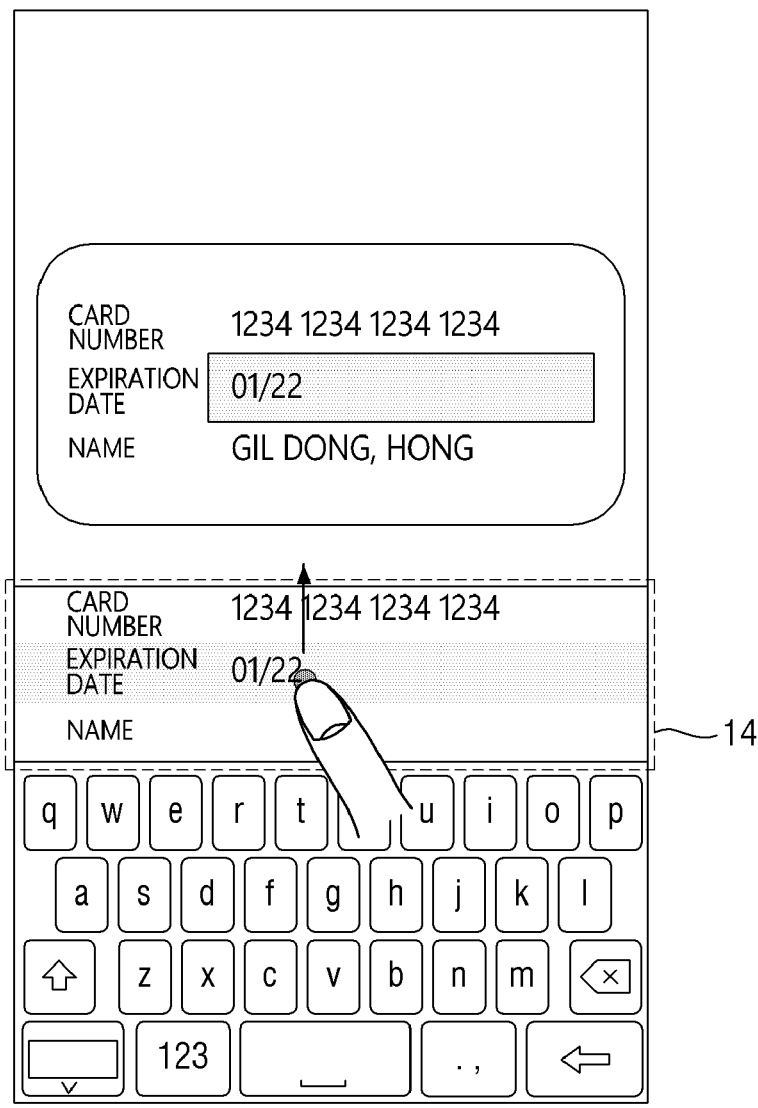
FIGS. 5a to 5c are diagrams for describing a method of moving an input field according to another embodiment of the present invention.
Figure 5B:
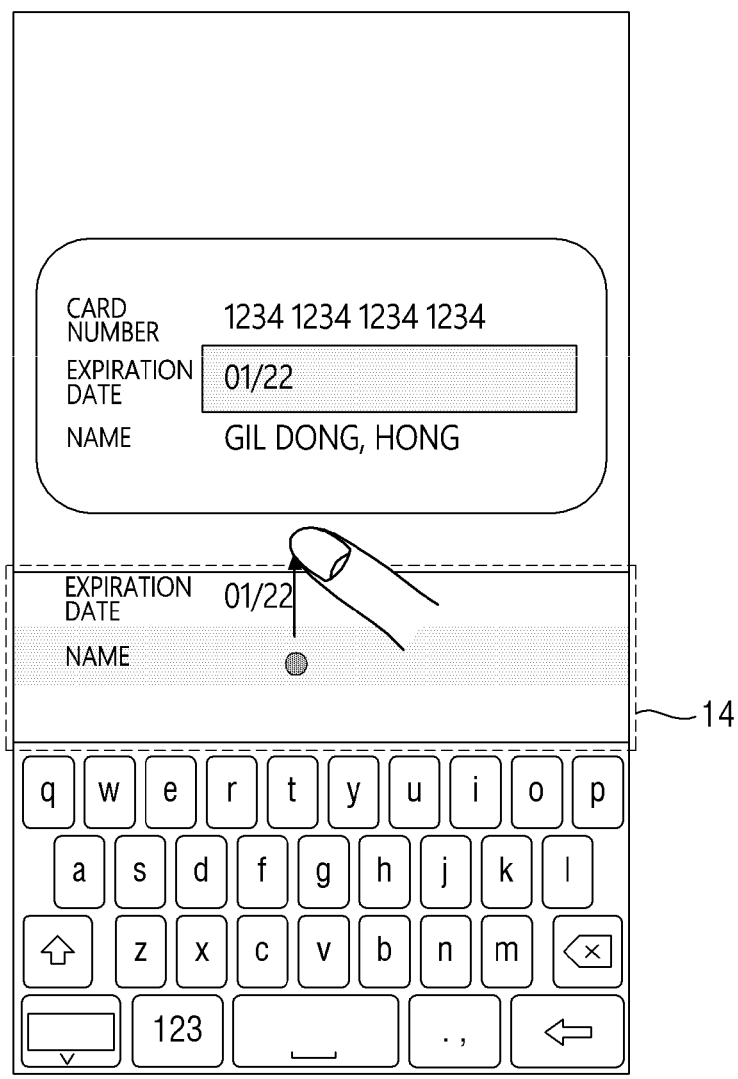
Figure 5C:

FIGS. 5*a* to 5*c* are diagrams for describing a method of moving an input field according to another embodiment of the present invention. Hereinafter, a method of moving an input field according to the present embodiment will be described with reference to FIGS. 5*a* to 5*c*.

Referring to FIGS. 5*a* and 5*b*, unlike FIG. 4*a*, a vertical list view is adopted in the user input field 14. As the horizontal list view is adopted in the present embodiment, the function execution device responds according to the touch gesture of the up and down direction. When the function execution device receives a touch gesture upward in the user input field 14, the device moves to the next label in the vertical list view, and the input focus of the upper screen moves from the first input field to the second input field.

Referring to FIGS. 5*b* and 5*c*, when the user inputs the last text in the input field corresponding to the name in FIG. 5*b*, the user intends the final completion action such as a payment request or the like based on the text described in the input field. According to the intention, when the function execution device receives the user's last touch gesture in the area of the user input field 14, it will be changed to the last complete screen as shown in FIG. 5*c*. Unlike FIG. 4*e*, it is changed to the last complete screen in response to a touch gesture from the bottom to the top, which is the touch gesture referred to in this embodiment.

Figure 6A:
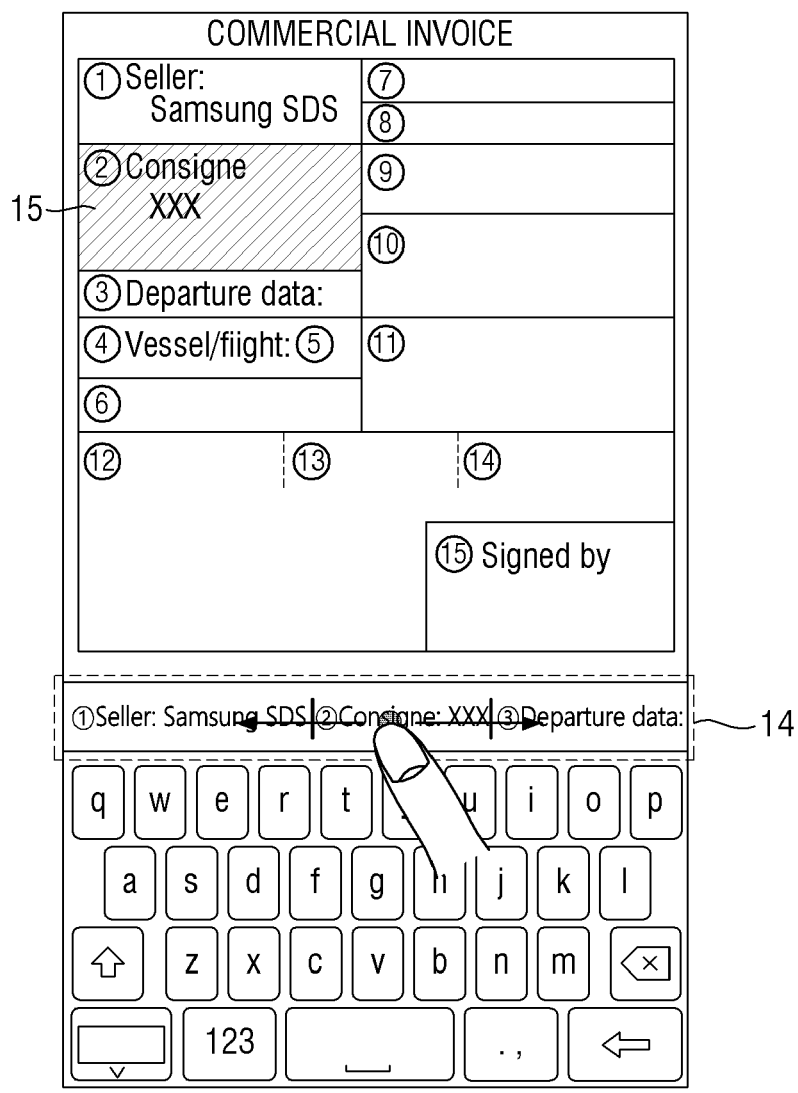
FIGS. 6a to 6c are diagrams for describing a method of moving an input field according to another embodiment of the present invention.
Figure 6B:
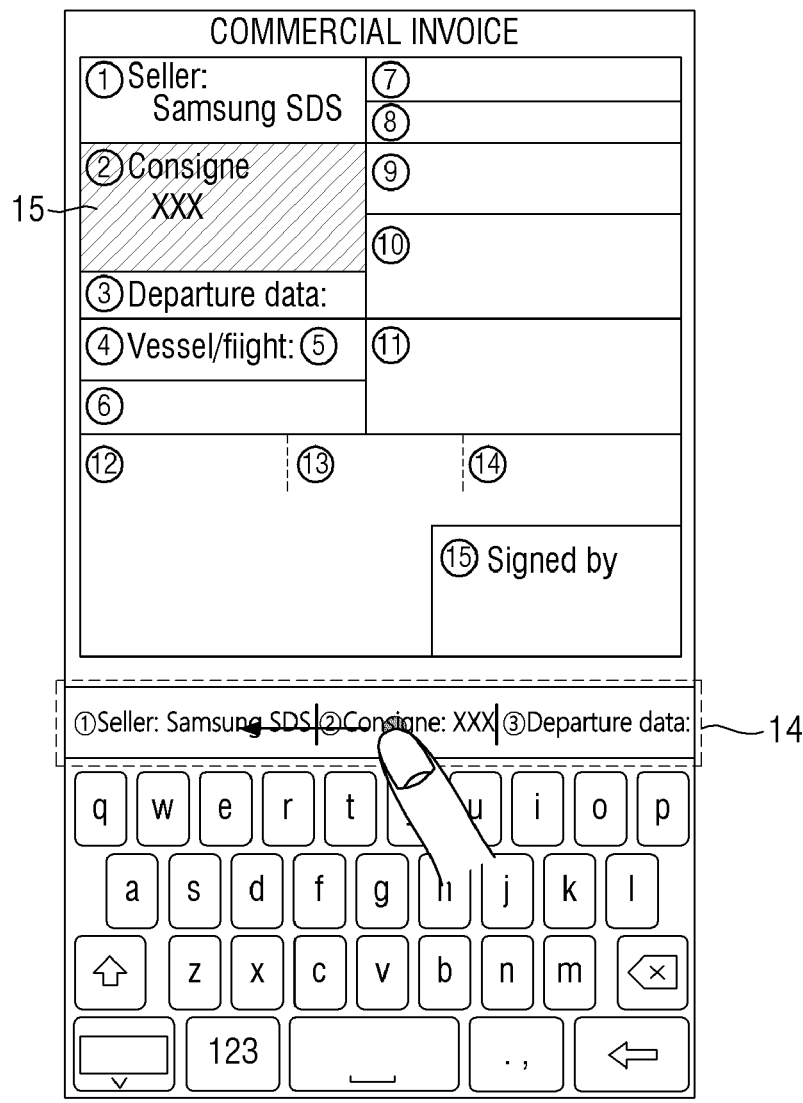
Figure 6C:
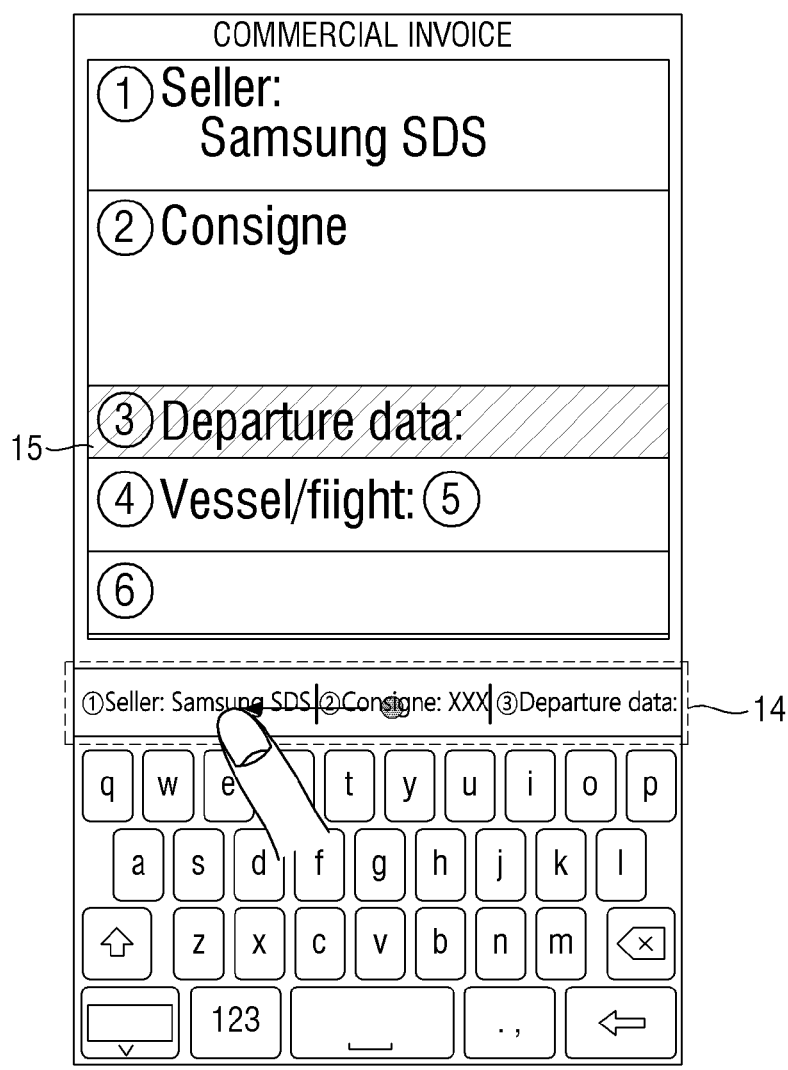

FIGS. 6*a* to 6*c* are diagrams for describing a method of moving an input field according to another embodiment of the present invention. Hereinafter, a method of moving an input field according to the present embodiment will be described with reference to FIGS. 6*a* to 6*c*.

Referring to FIG. 6*a*, a template including an input field is not sufficiently displayed on a small screen. In this case, the input focus may be moved from the first input field to the second input field using a touch gesture, and at the same time, the corresponding text may be provided to the user by enlarging the second input field.

Referring again to FIG. 6*a*, a first input field having an input focus is displayed on a screen, and text is described in a second input field, which is the previous input field of the first input field. In FIGS. 6*a* to 6*c*, the horizontal list view is illustrated in the user input field 14, but a vertical list view may be adopted.

In the present embodiment, the order of moving the input field through the touch gesture may be moved according to a predetermined order. For example, in the template of FIG. 6*a*, it can be seen that numbers are described in each label. The input focus may be moved in response to the touch gesture according to the number order described above.

Referring to FIGS. 6*b* and 6*c*, the process of moving the input focus and enlarging the input field will be described with reference to some embodiments of the present invention.

When a user inputs a touch gesture from right to left in order to move from a first input field having an input focus 15 to a second input field, which is the next input field, the function execution device may move the input focus 15 to the second input field in response to the touch gesture. At this time, the input focus 15 indicating the second input field and the second input field may be displayed on the enlarged screen at the same time or at different time. When the input focus 15 indicating the second input field is displayed on the enlarged screen, the user may input text in the user input field 14. In this case, when the user inputs text, the text input to the input field having the input focus may be displayed in real time.

If the template, in which the text information is described, is the same as the actual document form and there are several input fields, it is difficult to display all the labels and the text on the small screen. Further, in order to move to the next input field, the user needs a cumbersome operation of a touch input and a gesture such as pinching out.

In the present embodiment, when a simple drag gesture or a swipe gesture is received in the user input field 14 arranged in an area adjacent to a keypad, an input filed where the user intends to input text is enlarged and provided, and at the same time, the user can see what is being written in real time.

Figure 7:
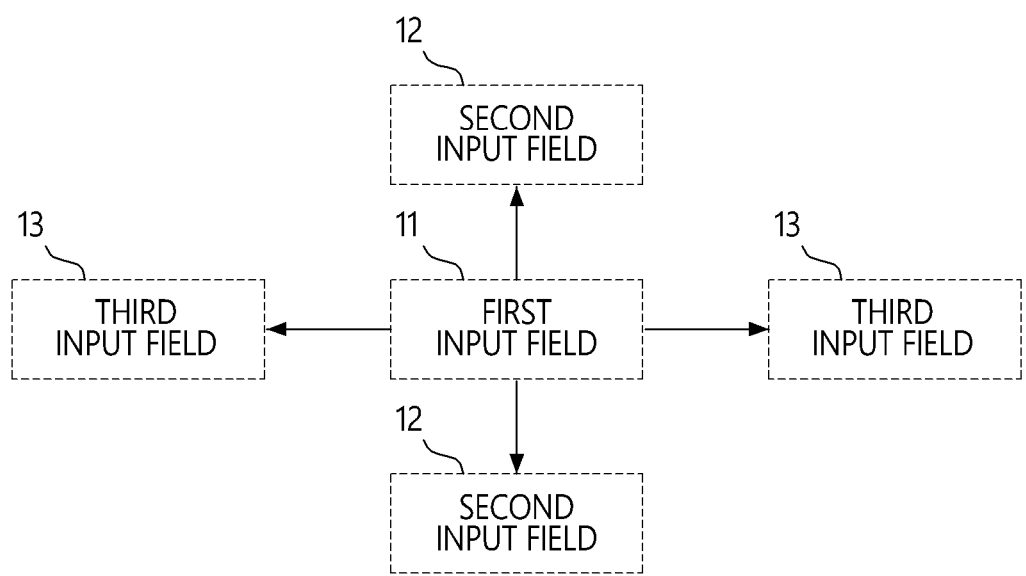
FIG. 7 is a diagram for describing a method of moving an input field according to another embodiment of the present invention.

FIG. 7 is a diagram for describing a method of moving an input field according to another embodiment of the present invention. Hereinafter, a method of moving an input field according to the present embodiment will be described with reference to FIG. 7.

Referring to FIG. 6*a*, an input field of a template, in which a user inputs text, is not aligned in one direction, but it can be seen that a template is aligned in several directions. In this case, a method of moving the input field according to a predetermined order may be adopted, but in order to improve the degree of freedom of movement of the input field, the input field may be moved according to the direction of the touch gesture.

Referring now to FIG. 7, the plurality of input fields includes a first input field 11, a second input field 12 and a third input field 13. The second input field 12 corresponds to an input field located in the up and down direction of the first input field 11, which is the current input field, and the third input field 13 corresponds to an input field located in the left and right direction of the first input field 11, which is the current input field.

In the present embodiment, the movement direction of the input field is determined by reflecting the direction of the user's touch gesture. For example, if the direction of the user's touch gesture corresponds to the vertical direction, the input focus (not shown) will move from the first input field to the second input field. For another example, if the direction of the user's touch gesture corresponds to the horizontal direction, the input focus will move from the first input field to the third input field.

In an embodiment, a method of moving an input field may include displaying a first input field having an input focus on a screen, receiving an input of touch gesture for an adjacent area of a keypad and moving the input focus to a second input field or a third input field in response to the input of touch gesture, wherein the third input field is perpendicular to the second input field, and the direction of movement of the input focus may coincide with the direction of the touch gesture. Accordingly, the moving direction of the user's input focus can be extended, and when the input field is moved on a template such as an actual document format, the user can easily move the input focus and the input field with one hand.

Figure 8:
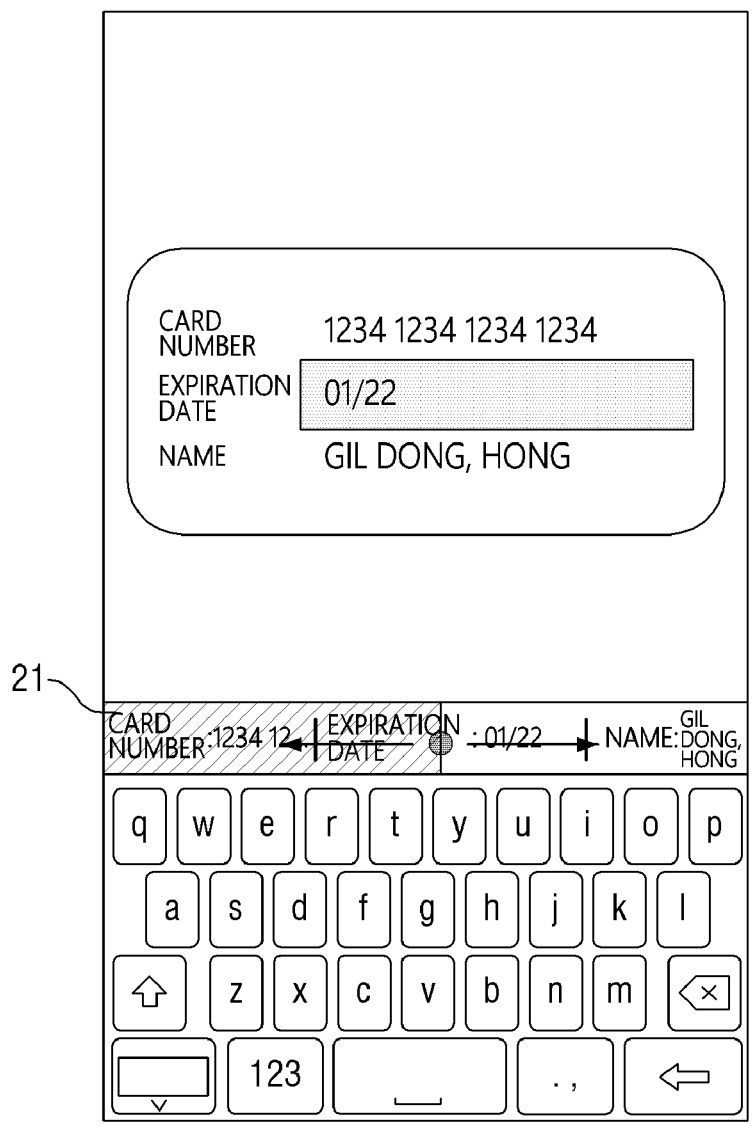
FIG. 8 is a diagram for describing a progress bar referred to in some embodiments of the present invention.

FIG. 8 is a diagram for describing a progress bar referred to in some embodiments of the present invention. Hereinafter, the progress bar will be described in detail with reference to FIG. 8.

Referring to FIG. 8, a progress bar 21 is illustrated in the user input field so as to be distinguished by a shape or a color. The user can check the current input field and the progress of the entire writing through the progress bar 21.

In an embodiment, the step of displaying of the first input field having the input focus on the screen may include displaying the progress bar 21 indicating a position of the input focus in a keypad adjacent area. Since the progress bar 21 is provided to the user, the progress of the writing of the plurality of input fields can be easily checked, and accordingly, a guide on the direction of the touch gesture can be provided to efficiently perform the touch gesture.

Figure 9A:
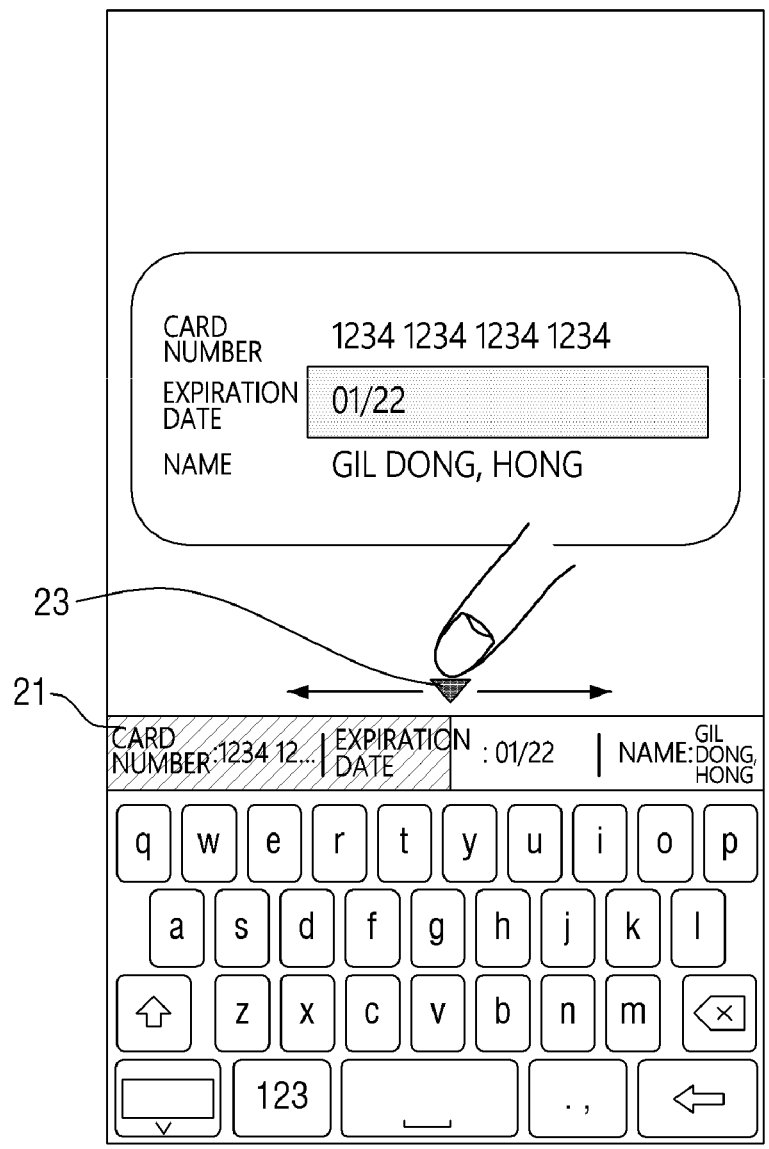
FIGS. 9a and 9b are diagrams for describing a drag button referred to in some embodiments of the present invention.
Figure 9B:
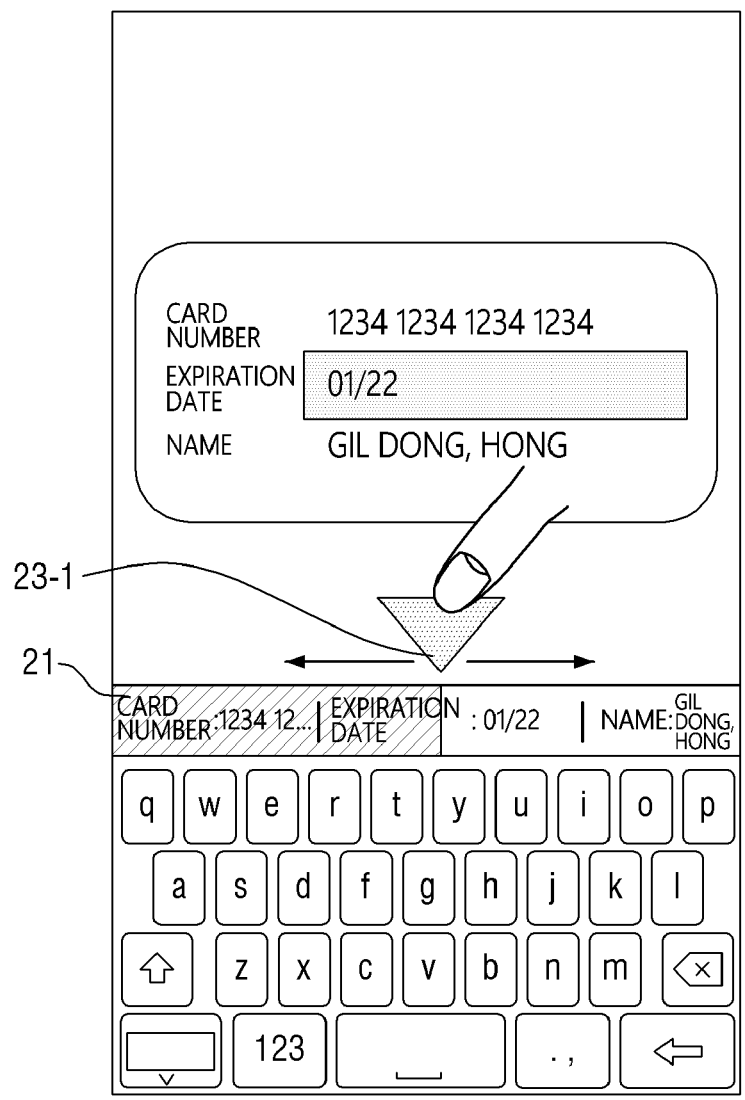

FIGS. 9a and 9b are diagrams for describing a drag button referred to in some embodiments of the present invention. Hereinafter, the drag button will be described in detail with reference to FIGS. 9a and 9b.

The user can quickly move the current input field to the input field at the position desired by the user by using the drag button 23 shown in FIG. 9a. For example, when the user moves the drag button 23 using the Flick gesture, the user can move from the current input field to another remote input field. Further, the drag button 23 may be located in the progress area displayed on the progress bar 21.

Further, when the touch is detected, in order for the function execution device to visually provide the operation state of the drag button 23 to the user, the drag button 23 may be enlarged and displayed.

It will be described in detail with reference to FIGS. 9a and 9b. Its FIG. 9a, the drag button 23 before the user touches the screen is illustrated. When the user touches the drag button 23 displayed on the screen, the drag button 23 is changed to the enlarged drag button 23-1 and displayed. Accordingly, the input field may be accurately moved by visually providing the user with whether the drag button 23 is operated.

Figure 10A:
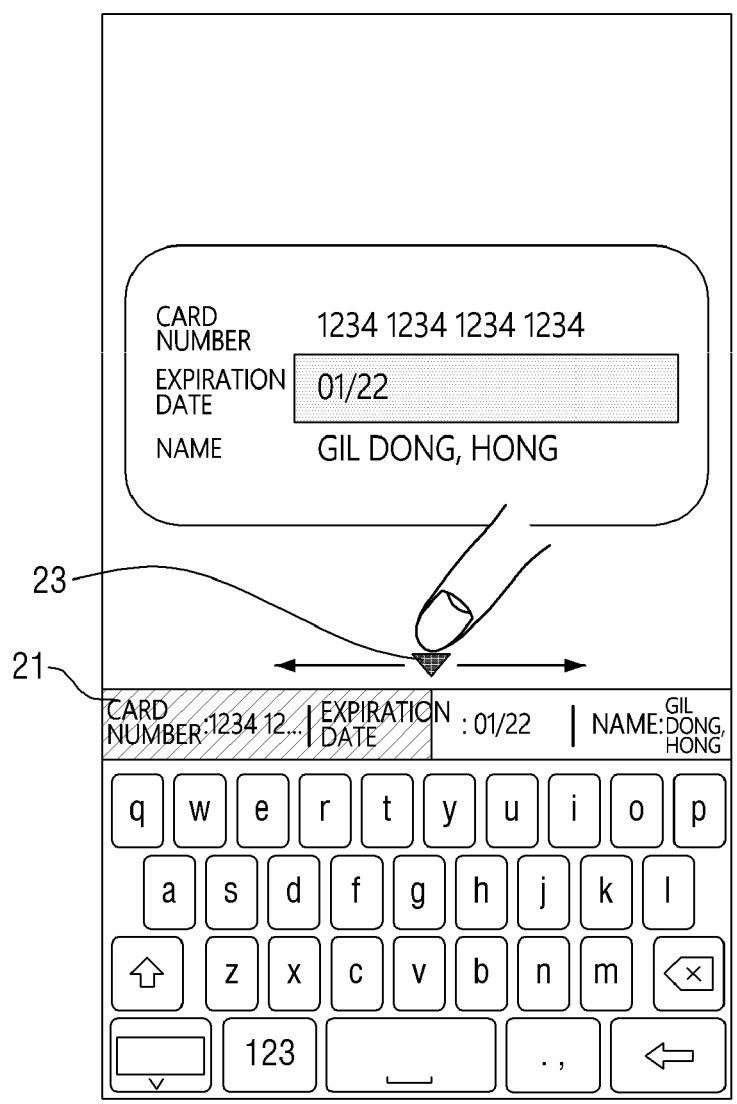
FIGS. 10a and 10b are diagrams for describing a label referred to in some embodiments of the present invention.
Figure 10B:
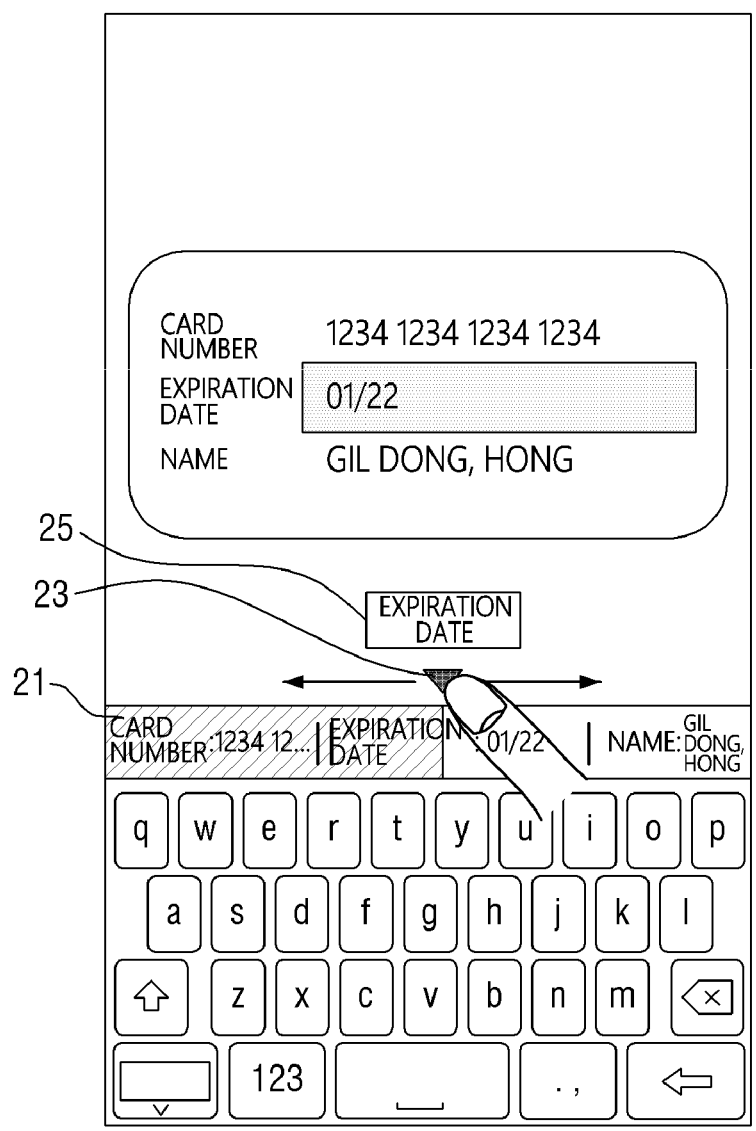

FIGS. 10a and 10b are diagrams for describing a label box referred to in some embodiments of the present invention. Hereinafter, the label box 25 will be described in detail with reference to FIGS. 10a and 10b.

Referring to FIG. 10b, the label box 25 is displayed on the screen of the function execution device adjacent to the drag button 23. The user may check a label corresponding to the input field in real time through the label box 25 when the drag button is moved to change the input field.

In an embodiment, the step of providing a drag button for moving the input focus at the top of a keypad adjacent area may include displaying a label box corresponding to the input focus in an area adjacent to the drag button.

Figure 11A:
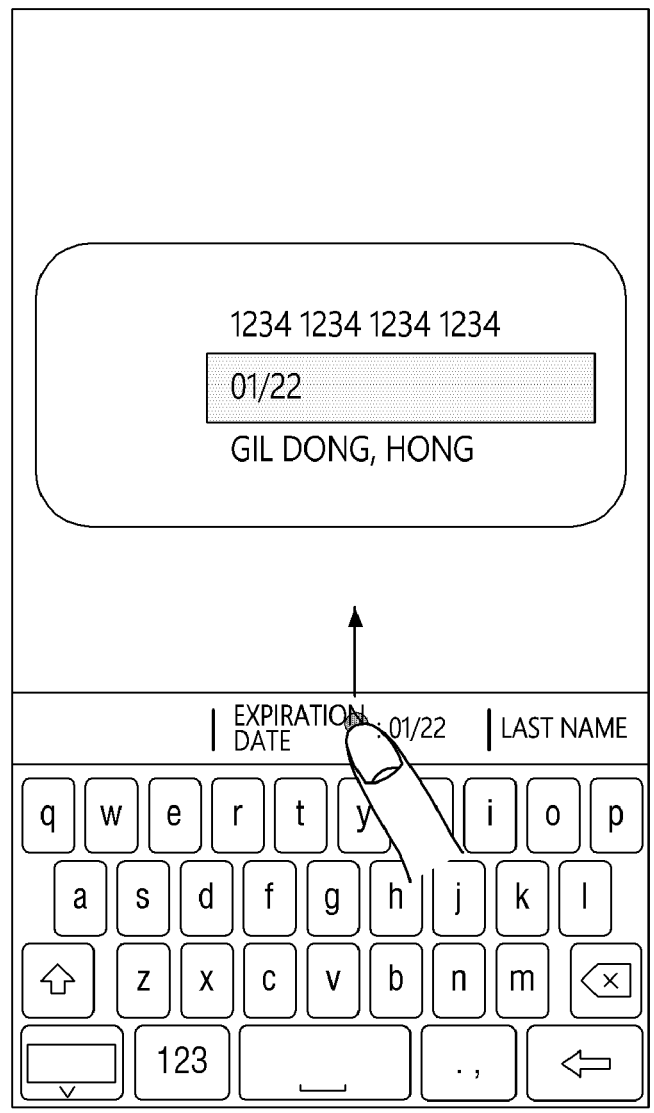
FIGS. 11a to 11b are diagrams for describing a list up referred to in some embodiments of the present invention.
Figure 11B:
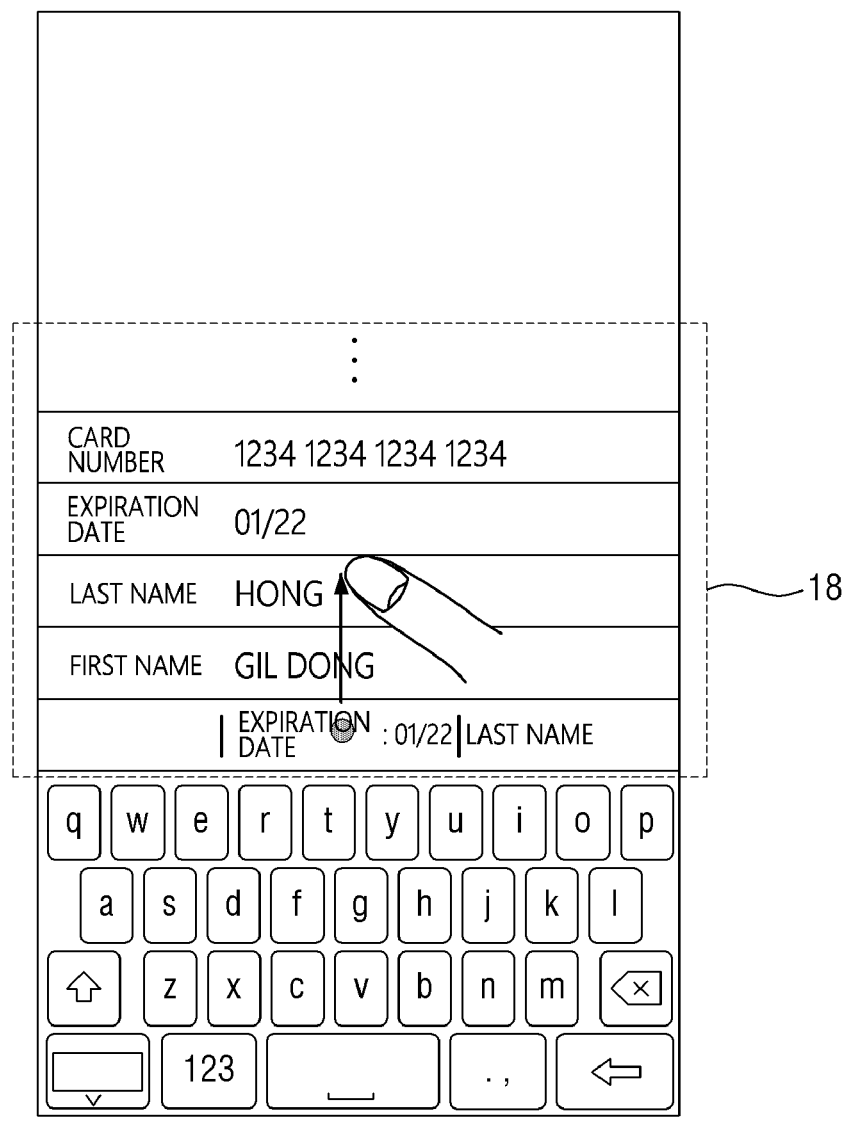

FIGS. 11a and 11b are diagrams for describing a list up referred to in some embodiments of the present invention. Hereinafter, the list up according to the present embodiment will be described with reference to FIGS. 11a and 11b.

Referring to FIG. 11a, the direction of the user's touch gesture is moving upward in the user input field area 14. When the function execution device receives the user's touch gesture, in response to the touch gesture, the list 18 of a label of the input field and text is expanded. The expanded list 18 can be seen s rich reference to FIG. 11b. By performing the list up process, the user can check at a glance whether the current input field is correctly described.

Figure 12A:
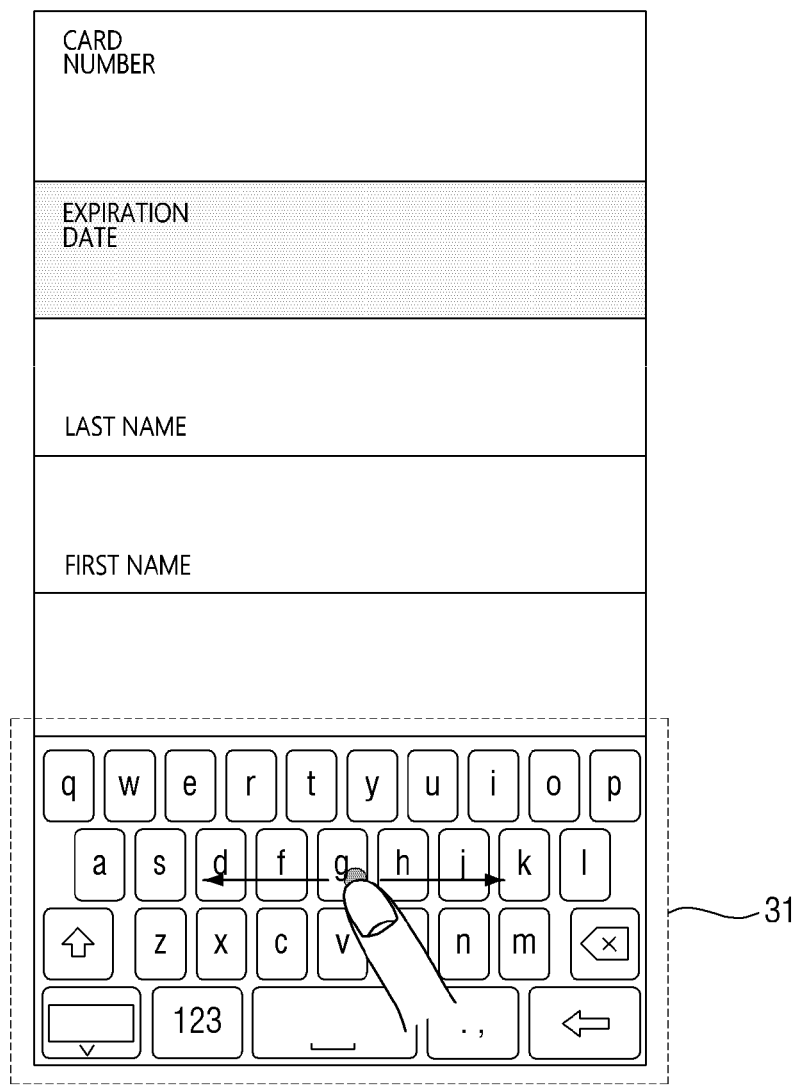
FIGS. 12a and 12b are diagrams for describing a keypad touch gesture area referred to in some embodiments of the present invention.
Figure 12B:
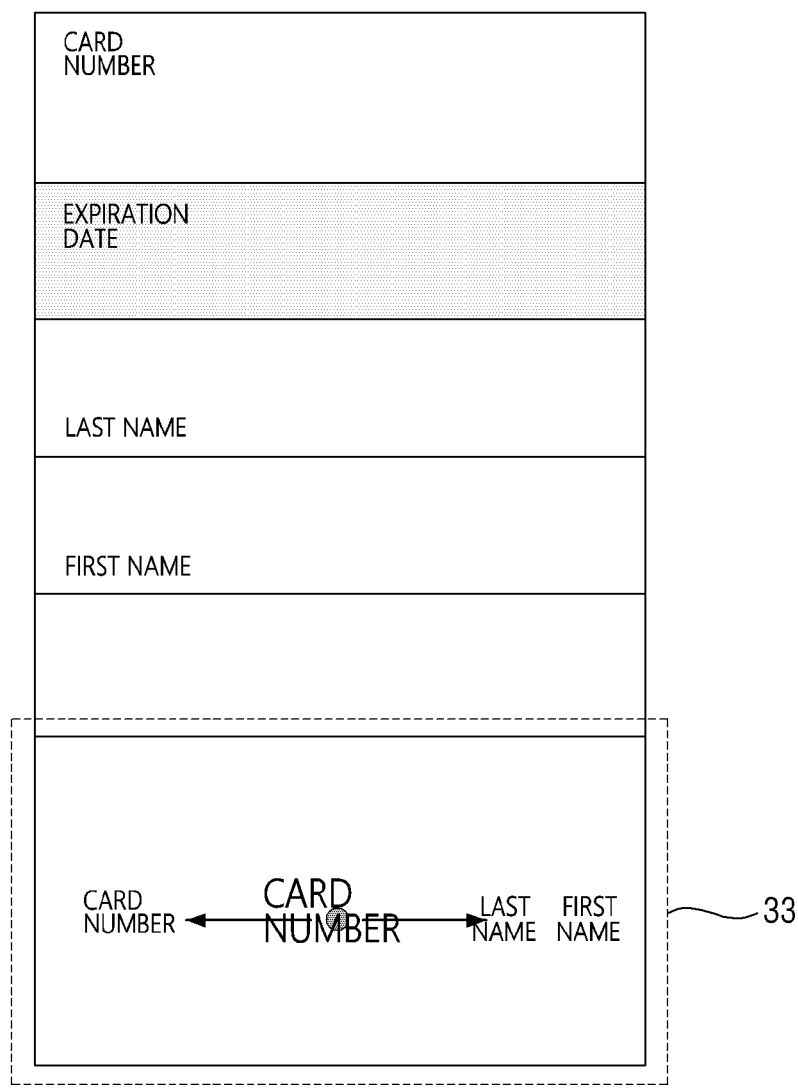

FIGS. 12a and 12b are diagrams for describing a keypad touch gesture area referred to in some embodiments of the present invention. Hereinafter, the keypad touch gesture area according to the present embodiment will be described with reference to FIGS. 12a and 12b.

Referring to FIG. 12a, the keypad screen 31 can be seen on the screen of the function execution device. In principle, the keypad screen 31 provides a keypad for inputting text in an input field. However, the keypad screen 31 may receive a touch gesture through an area of the keypad screen 31.

For example, when a gesture such as a user's long touch input or a double tap is detected on the keypad screen 31, the function execution device can change the keypad screen 31 to the keypad touch gesture area 33 as illustrated in FIG. 12b. Further, there is an advantage that the user can move the input focus and input field more easily by the changed keypad touch gesture area 33.

The concepts of the present invention described above with reference to FIGS. 1 to 12b may be implemented in computer readable codes on a computer readable medium. The computer readable recording medium may be, for example, a removable recording medium (CD, DVD, Blu-ray disc, USB storage device, removable hard disk) or a fixed recording medium (ROM, RAM, computer equipped hard disk). The computer program recorded on the computer readable recording medium may be transmitted to other computing device through a network such as Internet and installed in the other computing device, thereby being used in the other computing device.

Although the operations are shown in a specific order in the drawings, it should not be understood that the operations should be performed or executed in the specific order or sequential order as illustrated to achieve the desired results. In certain circumstances, multitasking and parallel processing may be advantageous. Moreover, the separation of the various configurations in the embodiments described above should not be understood as the necessity for such separation, and it should be noted that generally the program components and systems described may be integrated together into a single software product or packaged into multiple software products.

Although the embodiments of the present invention have been described above with reference to the accompanying drawings, those skilled in the art, to which the present invention belongs, can understand that the present invention may be implemented in other specific forms without changing the technical spirit or essential features thereof. Therefore, it should be understood that the embodiments described above are exemplary in all respects and not restrictive.

What is claimed is:

1. A method of moving an input focus in a plurality of input fields, the method comprising:
    displaying an input focus positioned in a first input field included in the plurality of input fields on a screen;
    displaying a user input field, the user input field including a list view having a plurality of labels corresponding to each of the plurality of input fields in a drag gesture input area on the screen, wherein the whole list view is displayed in the user input field at the same time, or a part of the list view is first displayed on the screen and the list view not first displayed in the user input field is sequentially displayed by a user's dragging in the user input field;
    receiving an input of a first drag gesture in the list view of the drag gesture input area on the screen, the drag gesture input area being different from a button of a keypad or an area of the displayed first input field; and moving the input focus to a second input field corresponding to a label of the list view which is selected by the input of the first drag gesture in the list view of the drag gesture input area.

2. The method of claim 1, further comprising,
displaying a second input field having an input focus on the screen, wherein the second input field is the last input field among the plurality of input fields;
receiving an input of a second drag gesture in the drag gesture input area after displaying the second input field; and
displaying the plurality of input fields and a complete button in response to the second drag gesture.

3. The method of claim 2, wherein the drag gesture input area and the user input field are positioned above the keypad.

4. The method of claim 2, wherein the plurality of input fields comprises the first input field, the second field and a third input field, and the second input field neighboring the first input field and the third input field;
the method further comprises:
when the moving of the input focus to the second input field, displaying the input focus in the second input field together with the first input field and the third input field on the screen;
receiving an input of a first drag gesture in a direction coinciding with a positioning direction of the first input field relative to the second input field or an input of a second drag gesture in a direction coinciding with a positioning direction of the third input field relative to the second input field; and
moving the input focus to the first input field or the third input field in response to the input of the first drag gesture or the second drag gesture.

5. The method of claim 1, further comprising:
displaying, upon detecting a text in the user input field, the text in the first input field having the input focus in real time.

6. The method of claim 1, wherein the displaying of the user input field comprises,
displaying a progress bar in the user input field to indicate a quantitative position of the first input field among the plurality of input fields.

7. The method of claim 1, wherein the displaying of the user input field comprises:
providing a drag button above the user input field for moving the input focus;
receiving an input of a drag gesture for the drag button; and
moving the input focus by reflecting a speed of the drag gesture for the drag button.

8. The method of claim 7, wherein the providing of the drag button comprises:
displaying a label box corresponding to the input focus in an area adjacent to the drag button.

9. The method of claim 1, further comprising,
moving the input focus to a third input field in response to an input of a third drag gesture,
wherein the third input field is perpendicular to the second input field; and
a direction of movement of the input focus coincides with a direction of the drag gesture.

10. The method of claim 1, wherein the moving of the input focus to the second input field comprises:
enlarging the input focus and the second input field.

11. The method of claim 1, wherein the receiving of the input of the first drag gesture comprises,
receiving an input of a long drag gesture on the keypad; and
changing the keypad to the drag gesture input area in response to the long drag gesture.

12. The method of claim 11, wherein the changing of the keypad comprises:
providing a label in the changed keypad.

13. The method of claim 1, further comprising:
receiving an input of a drag gesture perpendicular to the first drag gesture; and
displaying a list including the first input field and the second input field on a screen in response to the perpendicular drag gesture.

14. The method of claim 1, wherein the first drag gesture and the second drag gesture are drag gestures.

15. The method of claim 14, wherein the first drag gesture is a gesture of horizontally dragging.

16. The method of claim 1, wherein the drag gesture input area is an area adjacent to the keypad.

17. A computing apparatus comprising:
a display for displaying a plurality of input fields;
a processor; and
a memory for storing one or more instructions executed by the processor;
wherein the one or more instructions comprises:
an instruction for displaying an input focus positioned in a first input field included in the plurality of input fields on a screen;
an instruction for displaying a user input field, the user input field including a list view having a plurality of labels corresponding to each of the plurality of input fields in a drag gesture input area on the screen, wherein the whole list view is displayed in the user input field at the same time, or a part of the list view is first displayed on the screen and the list view not first displayed in the user input field is sequentially displayed by a user's dragging in the user input field;
an instruction for receiving an input of a first drag gesture in the list view of a drag gesture input area on the display and moving the input focus from the first input field to a second input field corresponding to a label of the list view which is selected by the input of the first drag gesture, wherein the drag gesture input area is different from a button of the keypad or an area of the displayed first input field.

* * * * *